Dec. 4, 1945.  S. L. GOOKIN  2,390,066
RACEWAY CLEARING DEVICE
Original Filed May 23, 1942
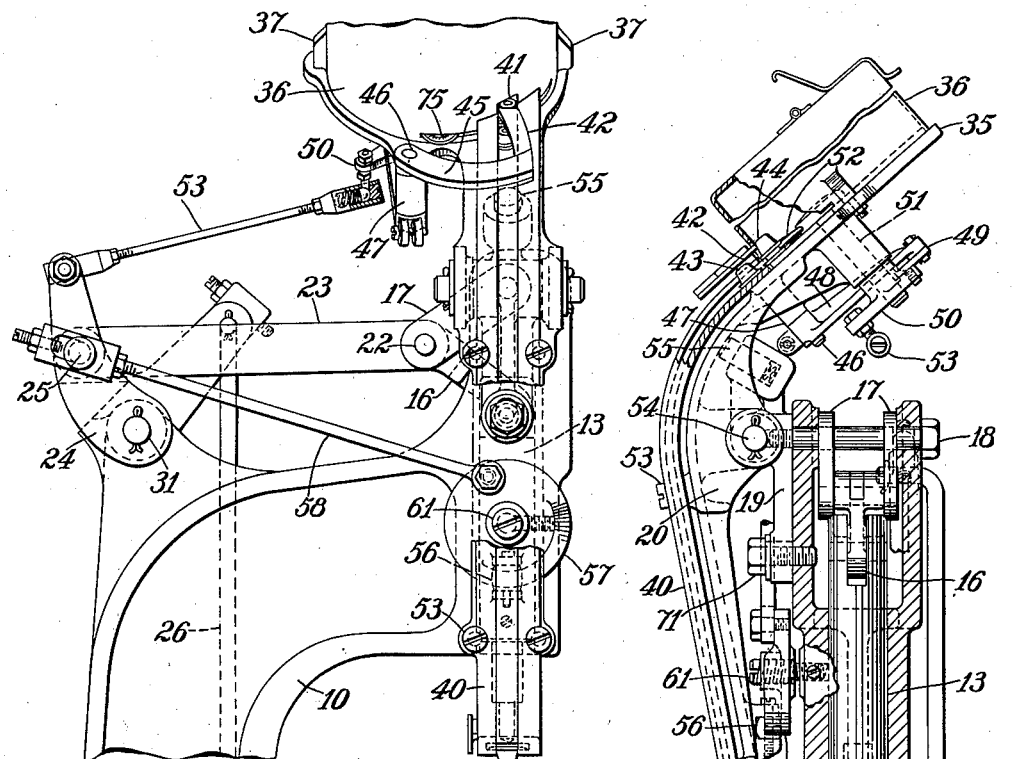
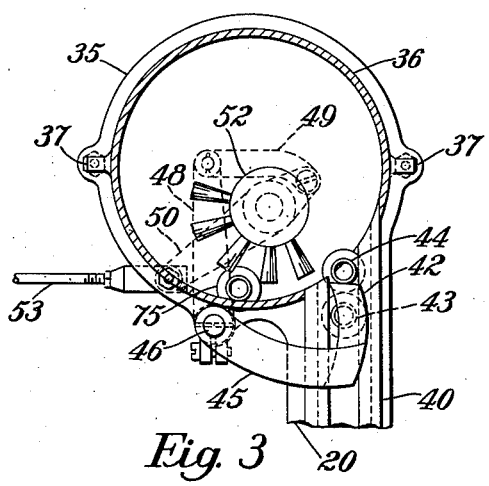
*Fig. 3*
*Fig. 1*
Inventor
Sylvester L. Gookin
By his Attorney Patented Dec. 4, 1945

2,390,066

UNITED STATES PATENT OFFICE 2,390,066

RACEWAY CLEARING DEVICE

Sylvester L. Gookin, Quincy, Mass., assignor to United Shoe Machinery Corporation, Flemington, N. J., a corporation of New Jersey Original application May 23, 1942, Serial No. 444,221. Divided and this application December 15, 1943, Serial No. 514,361

3 Claims. (Cl. 218—15.1)

The purpose of this invention is to provide means for clearing obstructions from an emission port of a hopper from which small articles of uniform shape and size are to be emitted one at a time but not otherwise. The subject matter of the present application is shown and described in my former United States Letters Patent No. 2,374,345, granted April 24, 1945, of which this is a division.

A typical example of the problem under consideration occurs when two or more articles such as grommets become nested one in another. In eyeleting parlance a grommet is a large eyelet. Not all grommets are capable of becoming nested, but a great many have so much taper in their barrels that nesting may occur frequently with the result that stacked grommets will obstruct an emission port designed to emit only one grommet at a time.

The accompanying drawing illustrates an embodiment of the present invention as applied to a machine for setting grommets, including a hopper and a raceway for supplying the grommets. The novel feature under present consideration includes a pusher adjacent to the emission port of the hopper and so mounted as not to obstruct normal and orderly emission of grommets one at a time, but to dislodge and repel two or more nested grommets obstructing the port. A short movement of the pusher is sufficient to remove such an obstruction and individual operation thereof would serve the purpose, but to relieve the operator from that duty the illustrated embodiment also includes coupling means by which the operating strokes of a feeding member inside the hopper are utilized to operate the pusher. Both the feeding member and the pusher derive their operating motions from the mechanism for setting the grommets.

Referring to the drawing,

Fig. 1 is a front elevation, partly in section, of a foot-power eyeleting machine in which the invention is embodied;

Fig. 2 is a side elevation of the upper portion of the machine; and

Fig. 3 is a sectional view of the hopper in an inclined plane and from the same side as Fig. 2, a portion of the raceway and the obstruction remover being included.

To facilitate comparison with the aforesaid Patent No. 2,374,345, the elements hereinafter described are identified by the reference numerals formerly used.

A hopper for grommets is formed in part by a cylindrical shell 36 and in part by an inclined bottom wall 35, the latter being a portion of a frame 20 to which a raceway 40 is affixed by screws 53. These elements constitute a movable unit. The frame 20 and a supporting bracket 19 are connected by a pivot pin 54 about which the former may oscillate to carry the delivery end of the raceway to and from the path of a vertically movable setting tool 12. This tool, carried by a plunger 13, cooperates with a fixed setting tool 11 and is provided with a spring-pressed spindle 14 adapted to pick grommets from the raceway. The bracket 19 is secured to the main frame 10 of the machine by screws 18 and 71. Lugs 37 formed on the shell 36 provide for securing the latter to the wall 35.

A brush 52 is located in the hopper to feed grommets to an emission port 41 in the lower side of the shell 36 (Fig. 2). The upper end of the raceway 40 is fitted into the lower portion of the emission port (Fig. 3) and its bottom plate is flush with the bottom wall of the hopper, the upper portion of the port being only wide enough to enable the barrel of a grommet to pass through it while the flange of the grommet is correctly seated on the wall 35 and in the raceway. A rockshaft 51 affixed to the brush extends through a bearing in the frame 20 and its lower end is provided with a lever 50 by which it may be oscillated.

An individual grommet 43, when correctly lodged in register with the emission port 41, will pass through it and slide down the raceway without encountering the pusher 42 which is situated outside the hopper and slightly above the normal path of travel of the grommets, but when a grommet such as that indicated at 44 is stacked upon the barrel of another grommet as illustrated in Fig. 1 its upper end will encounter the pusher and both of these grommets will be arrested in the port 41. A short movement of the pusher into the port will repel the grommet 44 and this grommet will displace the one on which it is stacked. Consequently, both grommets will be subjected to the sweep of the brush and thereby removed from the path of other grommets being swept toward the port.

An arm 45 of the pusher and an operating arm 48 are connected by a rockshaft 46 arranged to turn in a bearing 47 in the frame 20. A link 49 couples the arm 48 and the lever 50. This coupling is so arranged that any obstruction repelled by the pusher will be immediately swept aside by the brush which may, with the same stroke (counterclockwise), sweep an individual grommet 75 into the emission port and the raceway. Even while the pusher is thrust into the hopper a correctly positioned grommet (flange seated on the wall 35) may pass under it and through the emission port to an orderly position in the raceway, since the pusher remains always above the normal path of individual grommets so positioned as they approach the emission port.

The lever 50 receives operating motion from a treadle rod 26 with which it is connected by a bell crank lever 24 and a link 53. This bell crank lever is connected to the frame 10 by a fulcrum pin 31 and it serves also to provide motion for operating the plunger 13 and motion for oscillating the raceway unit about the pin 54. Toggle members 16 and 17 connect the plunger 13 and an anchoring pivot 18 in the frame 10, while a link 23 connects the lever 24 and the knee pivot 22 of the toggle.

The connections for operating the raceway unit include a cam 57, a cam roll 56 and a link 58 connecting the cam and a pin 25 carried by the bell crank lever 24. The cam turns on a supporting stud 61 affixed to the frame 10, and its effect is to displace the delivery end of the raceway from the path of the tool 12 while the latter is descending. Return motion of the raceway is derived from a spring-pressed follower 55 (Fig. 1) located above the pivot 54 and installed in the bracket 19. The cam roll 56 is thereby maintained against the cam 57.

The results derived from the bell crank 24 when the treadle rod is depressed are as follows: the link 23 depresses the setting tool 12; the link 58 retracts the raceway; and the link 53 feeds grommets in the hopper toward the emission port and at the same time projects the pusher 42 into the hopper to repel any nested grommets that may lie within its range.

Having described my invention, what I claim as new and desire to secure by Letters Patent of the United States is:

1. In a machine for affixing articles, a hopper having a bottom wall and an emission port through which only articles lying in a certain position on said wall may pass one at a time, a pusher arranged to engage and arrest an incorrectly positioned article obstructing said port but to pass over and miss an article correctly lodged in the port, and means for operating said pusher to repel an obstructing article from said port.

2. In an eyeleting machine having an eyelet-inserting tool and a raceway, a hopper arranged to supply eyelets thereto, the hopper having a bottom wall and an emission port through which only eyelets lying in a certain position on that wall may pass one at a time to the raceway, an eyelet-feeding member located in the hopper, means for operating said feeding member, a pusher arranged to engage and arrest an incorrectly positioned eyelet obstructing said port but to avoid an eyelet correctly lodged in the port, and means for operating said pusher to repel an obstructing eyelet from said port, the two said operating means being interconnected to operate in synchronism.

3. Article-supplying means comprising a hopper having an emission port and a bottom wall flush with the bottom of said port, a raceway arranged to receive articles emitted through said port, a movable member inside the hopper arranged to feed articles seated on said wall to said port, a movable member outside the hopper and having a pusher arranged to be thrust through the upper portion of said port to repel an article obstructing the port but to pass over and miss an article correctly lodged therein, and means arranged to oscillate said movable members in synchronism.

SYLVESTER L. GOOKIN.